US009106513B2

(12) United States Patent
Menezes et al.

(10) Patent No.: US 9,106,513 B2
(45) Date of Patent: Aug. 11, 2015

(54) UNIFIED COMMUNICATION AWARE NETWORKS

(75) Inventors: Pascal Menezes, Bellevue, WA (US); Wajih Yahyaoui, Bellevue, WA (US); Kapil Sharma, Woodinville, WA (US); Warren Barkley, Preston, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 554 days.

(21) Appl. No.: 13/428,883

(22) Filed: Mar. 23, 2012

(65) Prior Publication Data

US 2013/0254412 A1  Sep. 26, 2013

(51) Int. Cl.
G06F 15/16 (2006.01)
H04L 12/26 (2006.01)
H04L 12/927 (2013.01)
H04L 12/24 (2006.01)

(52) U.S. Cl.
CPC .......... *H04L 43/026* (2013.01); *H04L 41/0893* (2013.01); *H04L 47/805* (2013.01); *H04L 43/0852* (2013.01)

(58) Field of Classification Search
CPC ... H04L 43/026; H04L 43/028; H04L 47/805; H04L 47/803; H04L 41/0893; H04L 43/0852; H04L 47/24
USPC .......................... 709/207, 220–229, 238, 244
See application file for complete search history.

(56) References Cited

U.S. PATENT DOCUMENTS

| 7,181,532 B1* | 2/2007 | Chan .............................. 709/242 |
| 7,930,158 B2 | 4/2011 | Yemini et al. |
| 7,974,212 B2 | 7/2011 | Leung et al. |
| 8,612,612 B1* | 12/2013 | Dukes et al. ................... 709/228 |
| 2002/0083344 A1* | 6/2002 | Vairavan ........................ 713/201 |
| 2002/0165949 A1* | 11/2002 | Na et al. .......................... 709/223 |
| 2003/0131263 A1* | 7/2003 | Keane et al. ................... 713/201 |
| 2007/0078986 A1* | 4/2007 | Ethier et al. ................... 709/227 |
| 2008/0040306 A1* | 2/2008 | Ma ...................................... 707/1 |
| 2008/0089237 A1* | 4/2008 | Molen et al. ................... 370/252 |
| 2008/0137540 A1* | 6/2008 | Botvich ......................... 370/241 |
| 2009/0028135 A1 | 1/2009 | Mantripragada et al. |
| 2009/0103524 A1 | 4/2009 | Mantripragada et al. |

(Continued)

OTHER PUBLICATIONS

"Unified Communications Managed API 3.0 Core SDK Documentation", Retrieved at <<http://msdn.microsoft.com/en-us/library/gg421023.aspx>> Retrieved Date: Feb. 14, 2012, pp. 2.

(Continued)

*Primary Examiner* — Jude Jean Gilles
*Assistant Examiner* — Abdulkader M Alriyashi
(74) *Attorney, Agent, or Firm* — Andrew Smith; Jim Ross; Micky Minhas

(57) ABSTRACT

Unified Communication and Collaboration (UC&C) systems are enabled to dynamically enlighten a set of network elements (NEs) and/or network infrastructure with application awareness so that an accurate set of rules or actions can be applied for a given session without needing to lookup the payload of every packet or applying a somewhat ineffective expensive heuristic mechanisms. Taking advantage of typically longer communication session durations and separate control and media planes, a UC&C control point programs a set of NEs for a given UC&C media flow within a scalable and timely manner. Quality of Service (QoS), security, monitoring, and similar functionality may also be programmed into the NEs through the UC&C control point.

20 Claims, 9 Drawing Sheets

(56) References Cited

U.S. PATENT DOCUMENTS

| | | | |
|---|---|---|---|
| 2009/0327422 A1 | 12/2009 | Katis et al. | |
| 2010/0220727 A1* | 9/2010 | Zuk et al. | 370/392 |
| 2010/0325551 A1 | 12/2010 | Lauwers et al. | |
| 2011/0243144 A1 | 10/2011 | Kwon et al. | |
| 2012/0117254 A1* | 5/2012 | Ehrlich et al. | 709/228 |
| 2012/0140624 A1* | 6/2012 | Denman et al. | 370/230.1 |

OTHER PUBLICATIONS

Doren, Don Van, "Unified Communication and Collaboration from the User's Perspective", Retrieved at <<http://www.ucstrategies.com/unified-communications-expert-views/unified-communication-and-collaboration-from-the-users-perspective.aspx>> Dec. 8, 2009, pp. 2.

"Benefits of Deploying Unified Communications on a Cisco Integrated Network", Retrieved at <<http://www.cisco.com/en/US/prod/collateral/voicesw/ps6882/ps6884/solution_overview_c22-484573.html>> Retrieved Date: Feb. 14, 2012, pp. 8.

"Cisco Prime Central for HCS Assurance What's New", Retrieved at <<http://www.cisco.com/en/US/prod/collateral/netmgtsw/ps6491/ps12491/data_sheet_c78-701989.pdf>>, Retrieved Date: Oct. 1, 2012, pp. 4.

"A Practitioner's Guide to More Efficient Network Management", Retrieved at <<http://h10124.www.1.hp.com/campaigns/us/en/software/images/Practitioners_Guide.pdf>>, Retrieved Date: Oct. 1, 2012, pp. 8.

Zhang, et al., "QoEScope: Adaptive IP Service Management for Heterogeneous Enterprise Networks", Retrieved at <<http://www.nec-labs.com/~yueping/IWQoS09.pdf>>, In the 17th International Workshop on Quality of Service, IWQoS, Jul. 13, 2009, pp. 5.

"Building a Unified Communications and Collaboration Environment That Supports Virtual Teams", Retrieved at <<http://www.verizonbusiness.com/resources/whitepapers/wp_building-a-unified-communications-and-collaboration-environment-that-supports-virtual-teams_en_xg.pdf>>, Retrieved Date: Oct. 1, 2012, pp. 12.

Gilman, Brian, "The Power of Collaboration within Unified Communications—Business Case Considerations for Improving Energy Industry Operations", Retrieved at <<http://www.touchbriefings.com/pdf/3199/gilman.pdf>>, Retrieved Date: Oct. 1, 2012, pp. 4.

"Avaya Unified Communications Management Controls Costs", Retrieved at <<http://www.avaya.com/mx/resource/assets/factsheet/Avaya_Unified_Communications_Management_Controls_Costs_fact_sheet.pdf>>, Retrieved Date: Oct. 1, 2012, pp. 2.

\* cited by examiner

UNIFIED COMMUNICATION AWARE NETWORKS

BACKGROUND

Modern communication systems have a large number of capabilities including integration of various communication modalities with different services. For example, instant messaging, voice/video communications, data/application sharing, white-boarding, and other forms of communication may be combined with presence and availability information of subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

In modern digital networks, intelligence may be applied at every point in the network so that each Network Element (NE) performs a deep packet inspection on every packet to determine the fingerprint of an application so that various actions such as Quality of Service (QOS), Intrusion Detection/Protection (IDS/IDP), Firewalling, Network Monitoring, Load Balancing, etc. can be performed. In some cases NEs can just inspect the five tuple information of an IP header and apply the corresponding action, but more and more sophisticated systems like UC&C use dynamic transport ports and encrypt the payload which makes the inspection difficult to perform. While there exist brute force heuristic mechanisms to handle some of these cases, these come at the expense of making NEs more intelligent (thereby increasing the cost) and more prone to errors.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling systems like Unified Communication and Collaboration (UC&C) to dynamically enlighten a set of network elements (NEs) and/or network infrastructure with application awareness so that an accurate set of rules or actions can be applied for a given session without needing to lookup the payload of every packet or applying a somewhat ineffective expensive heuristic mechanisms. Taking advantage of typically longer communication session durations and separate control and media planes, a UC&C control point may be enabled to program a set of NEs for a given UC&C media flow within a scalable and timely manner. Quality of Service (QoS), security, monitoring, and similar functionality may also be programmed into the NEs through the UC&C control point.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
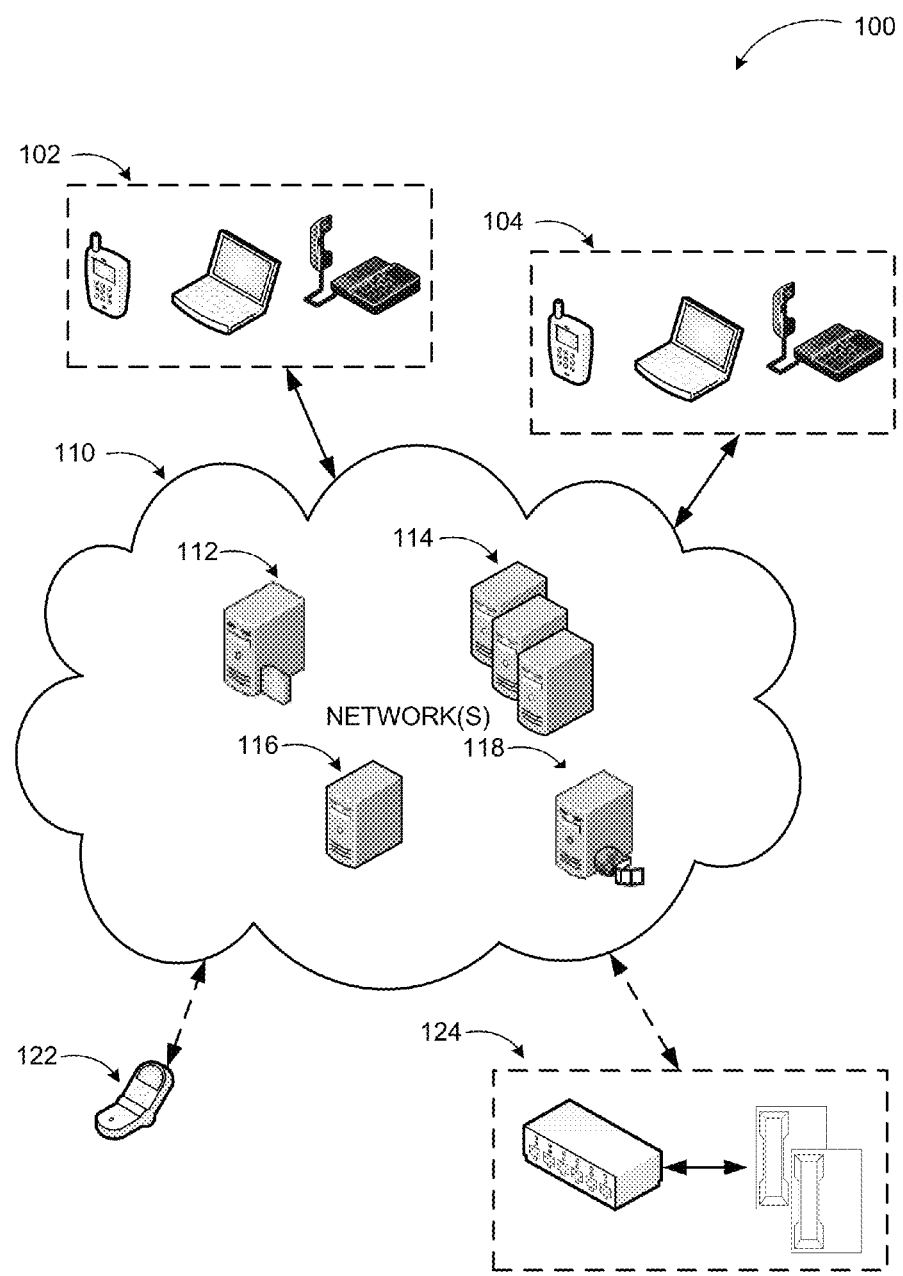
FIG. 1 is a diagram illustrating an example UC&C system, where embodiments may be implemented for UC aware networks.

As briefly described above, Unified Communication and Collaboration (UC&C) can dynamically enlighten a set of inexpensive network elements (NEs) and/or network infrastructure with application awareness so that an accurate set of rules or actions can be applied for a given session without needing to lookup the payload of every packet or applying a somewhat ineffective expensive heuristic mechanisms. UC&C commonly uses a control plane in which signaling discovers, setups and secures two or more endpoints before media is exchanged. This decoupling of control and media plane allows the control point to enlighten a network infrastructure with a rich set of information when a new UC&C dialog is about to be setup and/or being torn down. In addition UC&C dialogs are commonly long lived flows in which the signaling plane sets up a session before media can flow. Typical dialog time lengths can range from 5 seconds to hours as UC&C is mostly about human to human interaction as opposed to machine to machine. Taking advantage of these features, a UC&C control point can program a set of NEs for a given UC&C media flow within a scalable and timely manner (unlike traditional short lived flows like HTTP web traffic). Even if for some reason a policy does not to arrive to a NE in a timely manner, due to a failure in the network or system, a UC&C media flow that was already on the wire may, at worst case scenario, be treated by not applying QoS, security and monitoring properly.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components for providing multimodal communication services such as audio calls, video conferences, and/or data exchange. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a diagram illustrating an example UC&C system, where embodiments may be implemented for UC aware networks. A unified communication system is an example of modern communication systems with a wide range of capabilities and services that can be provided to subscribers. A unified communication system is a real-time communications system facilitating instant messaging, presence, audio-video conferencing, web conferencing functionality, and comparable capabilities. Modern unified communication systems are complemented with collaboration capabilities enabling users to share, create, modify, and perform other collaborative tasks on various types of documents and exchange documents in different communication sessions. Such systems may also be referred to as Unified Communication & Collaboration (UC&C) systems.

In a UC&C system such as the one shown in diagram 100, users may communicate via a variety of end devices (102, 104), which are client devices of the UC&C system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). The end devices may also enable users to manage documents of different types such as word processing documents, spreadsheet documents, presentation documents, and comparable ones. End devices may include any type of smart phone, cellular phone, any computing device executing a communication application, a smart automobile console, and advanced phone devices with additional functionality.

UC&C Network(s) 110 includes a number of servers performing different tasks. For example, UC&C servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC&C servers 114 may provide access to these additional communication modes (e.g. instant messaging, video communication, etc.) through access server 112. Access server 112 resides in a perimeter network and enables connectivity through UC&C network(s) 110 with other users in one of the additional communication modes. UC&C servers 114 may include servers that perform combinations of the above described functionalities or specialized servers that only provide a particular functionality. For example, home servers providing presence functionality, routing servers providing routing functionality, rights management servers, and so on. Some of the UC&C servers 114 may provide hosted applications for collaboration on documents such as spreadsheet, word processing, presentation, graphic processing, and so on. Similarly, access server 112 may provide multiple functionalities such as firewall protection and connectivity, or only specific functionalities.

Audio/Video (A/V) conferencing server 118 may provide audio and/or video conferencing capabilities by facilitating those over an internal or external network. Mediation server 116 may mediate signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP may be a commonly employed method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real time Transport Protocol ("RTP").

As an example some UC&C systems may use Secure Real Time Transport Protocol (SRTP) as the transport for voice and video media. Additionally, SRTP uses dynamic ports which are negotiated between two UC&C endpoints within the payload of an encrypted signaling protocol like SIP. When a NE tries to process a UC&C packet it may perceive the signaling protocol as TCP and the media payload as UDP. While the encrypted signaling protocol may use a well-known port like SIP TCP Port 5061, the NE typically has no further visibility into the SIP payload, which may further describe the SRTP associated media transport ports. This obscuration may make all media UDP packets invisible to the NE unless it tries to apply a RTP header to every non-well known UDP packet to further validate if it is real-time media. If the NE does this, it has to further validate the packet to determine if it is voice or video by inspecting the payload size and the rate of other packets within the similar five tuple signature. To further complicate matters, the NE may still not know which application generated this media packet and if this packet can be trusted or if it is a Denial of Service (DoS) attack by an internal user or compromised system.

While the example system in FIG. 1 has been described with specific components such as mediation server, A/V server, and similar devices, embodiments are not limited to this system of the example components and configurations. A service for managing multimodal communications with UC aware networks may be implemented in other systems and configurations employing fewer or additional components.

Figure 2:
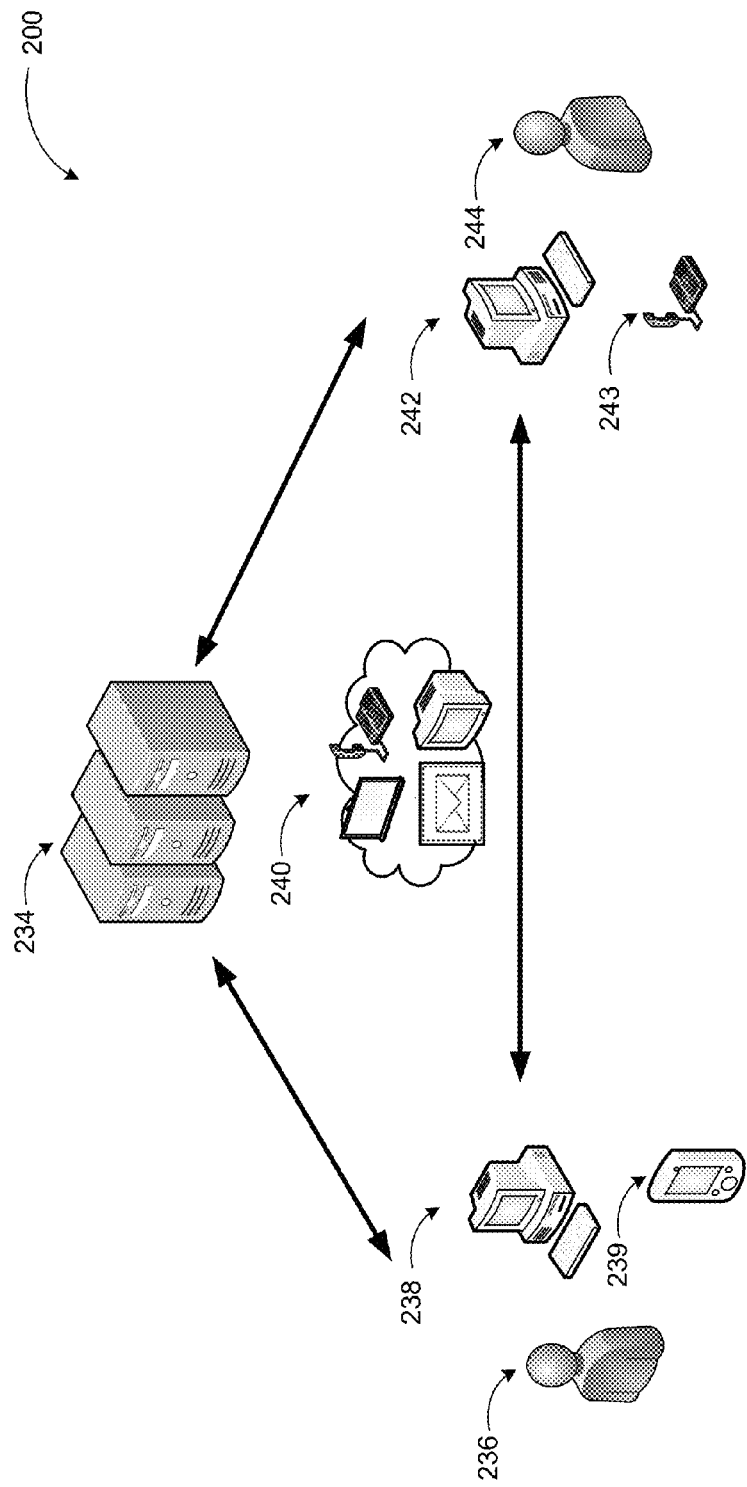
FIG. 2 is a conceptual diagram illustrating a basic example system for providing multimodal communications with collaboration.

FIG. 2 is a conceptual diagram illustrating a basic example system for providing multimodal communications with collaboration. While a system according to embodiments is likely to include a number of servers, client devices, and services such as those illustratively discussed in FIG. 1, only those relevant to embodiments are shown in FIG. 2.

As mentioned previously, communication between two or more users in an enhanced communication system such as a UC&C system may be facilitated through multiple devices with varying communication mode capabilities. In a UC&C system employing SIP for communication between endpoints, a caller may initiate a communication session by sending an INVITE to the called party. The called party may potentially accept the INVITE from a number of different devices or endpoints. However, not all these devices may be able to handle all forms or modalities of communication. In a system according to embodiments, the INVITE may be sent to devices capable of handling the requested mode of communication.

According to an example scenario, a communication server (e.g. server 234) may facilitate a conversation between a client application providing communication UIs to a user and an automated application. The conversation may start in audio mode (e.g. a user talking to an automated service center). Later in the conversation, the application may request the user to provide a form and send the form as file transfer to the client application of the user. The client application may send the file back, which may be facilitated by another server responsible for file transfers and processing (collaboration).

The basic components of a system according to embodiments include client devices 238 and 239 executing communication applications for user 236, client devices 242 and 243 executing different versions of the same or a different communication application for user 244, and servers 234. The communication applications for users 236 and 244 facilitate multi-modal communication sessions 240 (over one or more networks) between the users 236 and 244, as well as the users and automated applications on one or more of the servers 234.

Each modality within the conversation may be managed by a different server such as a file server for file exchanges, an A/V server for managing audio/video communications, an email server for managing exchange of emails or instant messages, and so on. Other modalities that may be used video conferencing, white-boarding, file transfer, and comparable ones.

Figure 3:
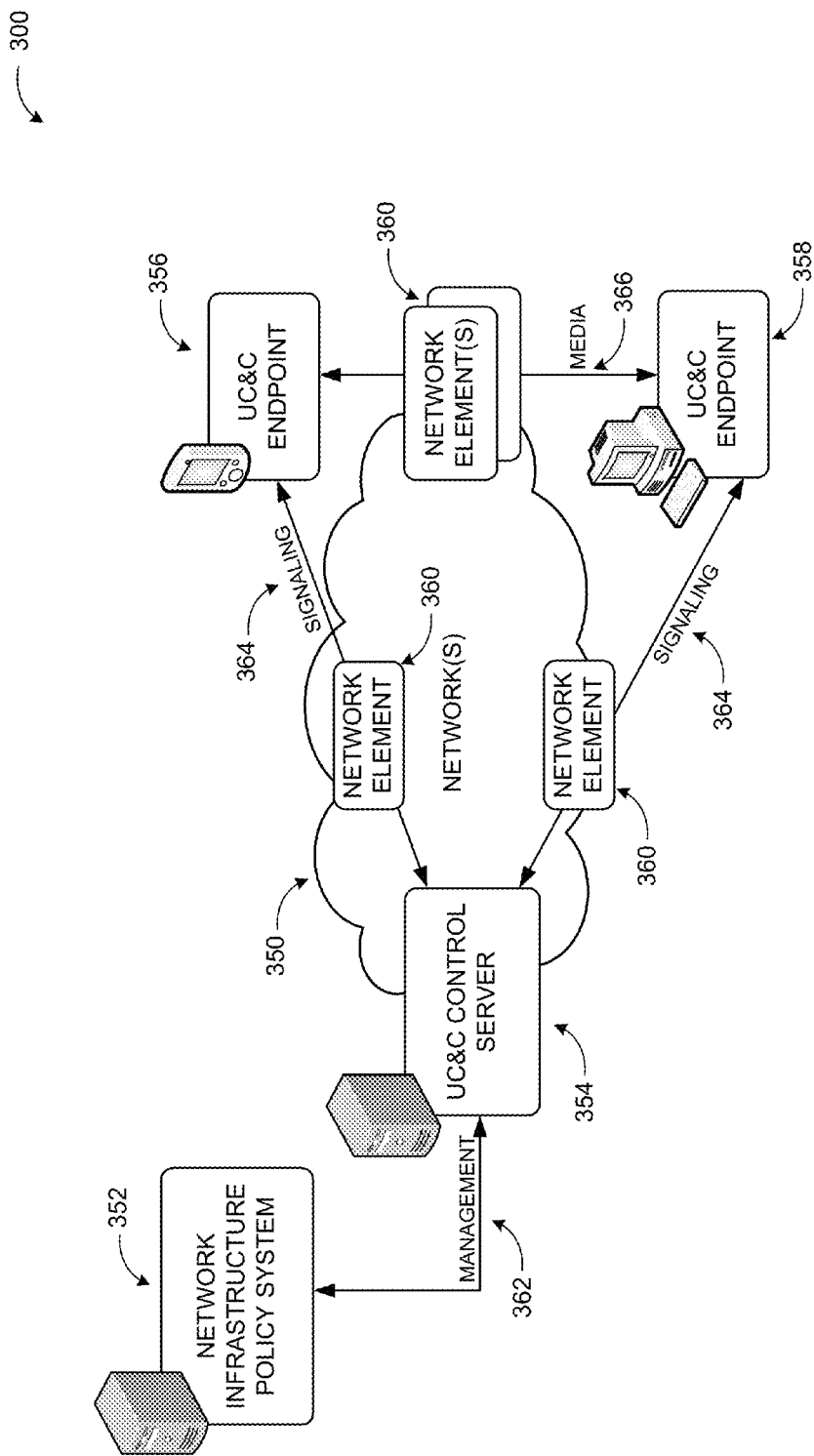
FIG. 3 illustrates management, signaling, and media exchange between major components of a system according to some embodiments.

FIG. 3 illustrates management, signaling, and media exchange between major components of a system according to some embodiments in diagram 300.

UC&C systems employ a control plane, in which signaling 364 discovers, sets up, and secures two or more endpoints 356, 358 before media 366 is exchanged. As new dialogs appear in the UC&C network 350, the UC&C control server 354 may enlighten a network infrastructure policy system 352 as to the creation or deletion of a given dialog with a rich set of dialog attributes called a UC&C dialog information element. This communication may happen in the management plane 362 while the signaling plane is setting up the media plane between one or more UC&C endpoints 356, 358.

The decoupling of control and media planes allows the UC&C control server 354 to enlighten the network infrastructure with a rich set of information when a new UC&C dialog is about to be setup and/or being torn down. Subsequently, the UC&C control server 354 can program a set of NEs 360 for a given UC&C media flow in a scalable and timely manner.

Figure 4:
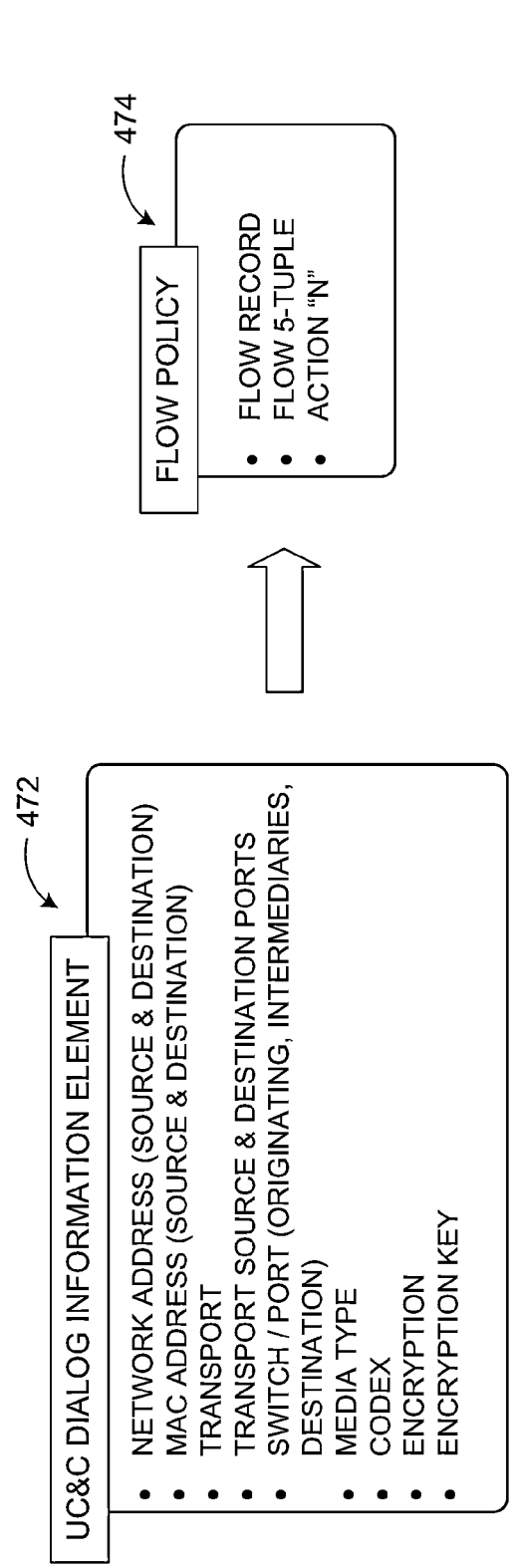
FIG. 4 illustrates how a network infrastructure distributes and interprets a UC&C dialog information element to a flow policy.

FIG. 4 illustrates how a network infrastructure distributes and interprets a UC&C dialog information element to a flow policy in diagram 400.

Each UC&C dialog information element 472 may include a rich set of attributes about a given dialog in which the network infrastructure policy system may use to process it into a network flow policy 474. This association of a UC&C dialog information element 472 to a network infrastructure flow policy 474 is the basic atomic structure of what the NEs may use to index a packet to a given UC&C media flow. The UC&C dialog information element 472 may include, for example, network addresses for source and destination, MAC addresses for source and destination, transport, transport source and destination ports, switches and/or ports (originating, intermediaries, and destination), media type, codex, encryption, and encryption key information. Within the flow policy 474 a five tuple IP address and transport port index may allow each NE along the media path to identify and perform the correct action, accuracy, and authenticity.

Figure 5:
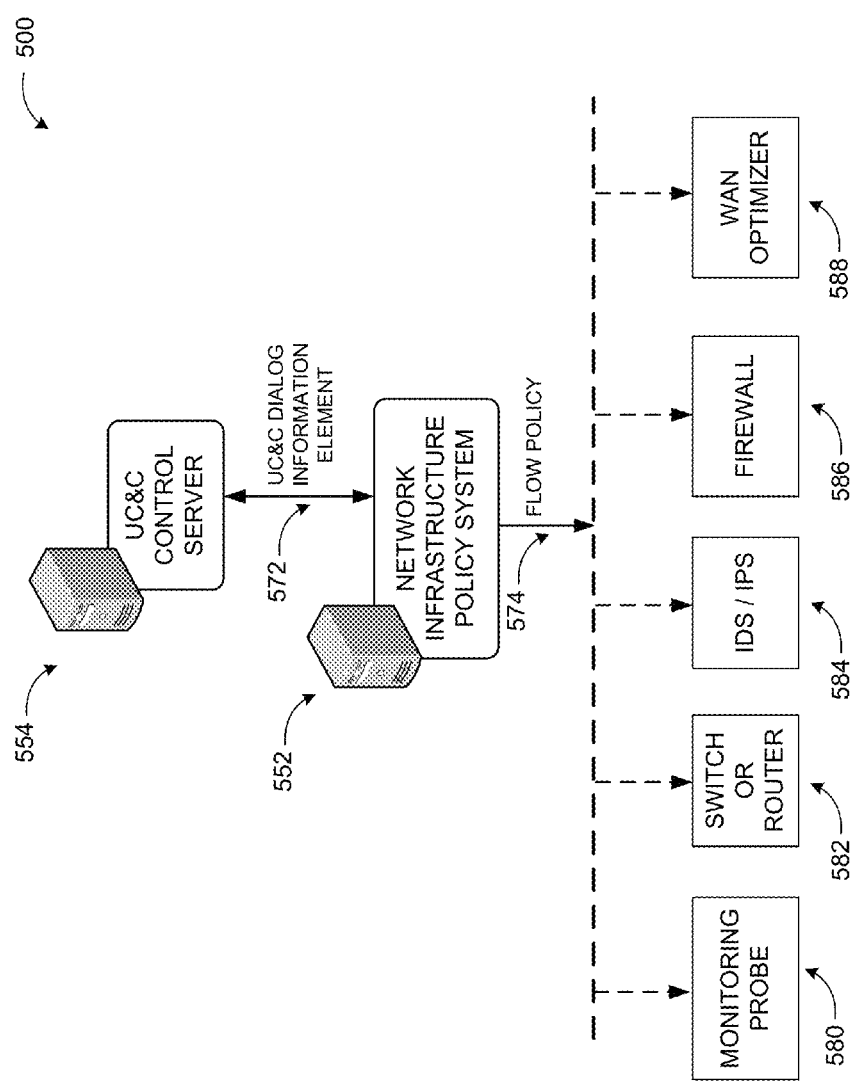
FIG. 5 illustrates the enforcement of the flow policy at various components of a system according to some embodiments.

In one example scenario, the UC&C dialog information element 472 may include following information:
IP SA & DA-SA 1.1.1.1 DA 2.2.2.2
MAC SA & DA-SA 48-2C-6A-1E-59-3D DA 65-1C-6B-3D-42-4B
Transport=TCP
Transport SP & DP=10000 and 10050
Switch (originating, intermediaries, destination)
Ports (originating, intermediaries, destination)
Media Type=Voice
Codex=G.711
Encryption=enabled
Encryption Key=864A1C4793BB246A
The corresponding flow policy 474 may look like:
Flow Record=102
Flow 5 Tuple=SA 1.1.1.1, DA 2.2.2.2, TCP, SP 10000, DP 10050
Action 1=QoS EF Queue
Action 2=Count FIG. 5 illustrates the enforcement of the flow policy at various components of a system according to some embodiments in diagram 500.

How a network infrastructure and policy system 552 distributes and interprets a UC&C dialog information element 572 received from a UC&C control server 554 to a flow policy 574 may be an implementation decision and the protocol, architecture and hierarchy may be a function of scale and performance. Each NE within a given network infrastructure may be dynamically provisioned to the exact knowledge for a given UC&C media flow so that accuracy, authenticity and policy is enforced in a timely manner.

In the example system of diagram 500, a monitoring element (probe) 580 may perform counting actions and a switch or router 582 may perform the actions of prioritizing, shaping, allowing/denying, or counting. Further network elements may include an Intrusion Detection/Protection (IDS/IPS) element 584, which may allow or deny the flow and count, and a firewall 586 may allow or deny, as well as count. A wide area network (WAN) optimizer 588 may also prioritize, shape, or count. Of course, a number of other network elements with varying functionality may be employed using the same principles.

Figure 6:
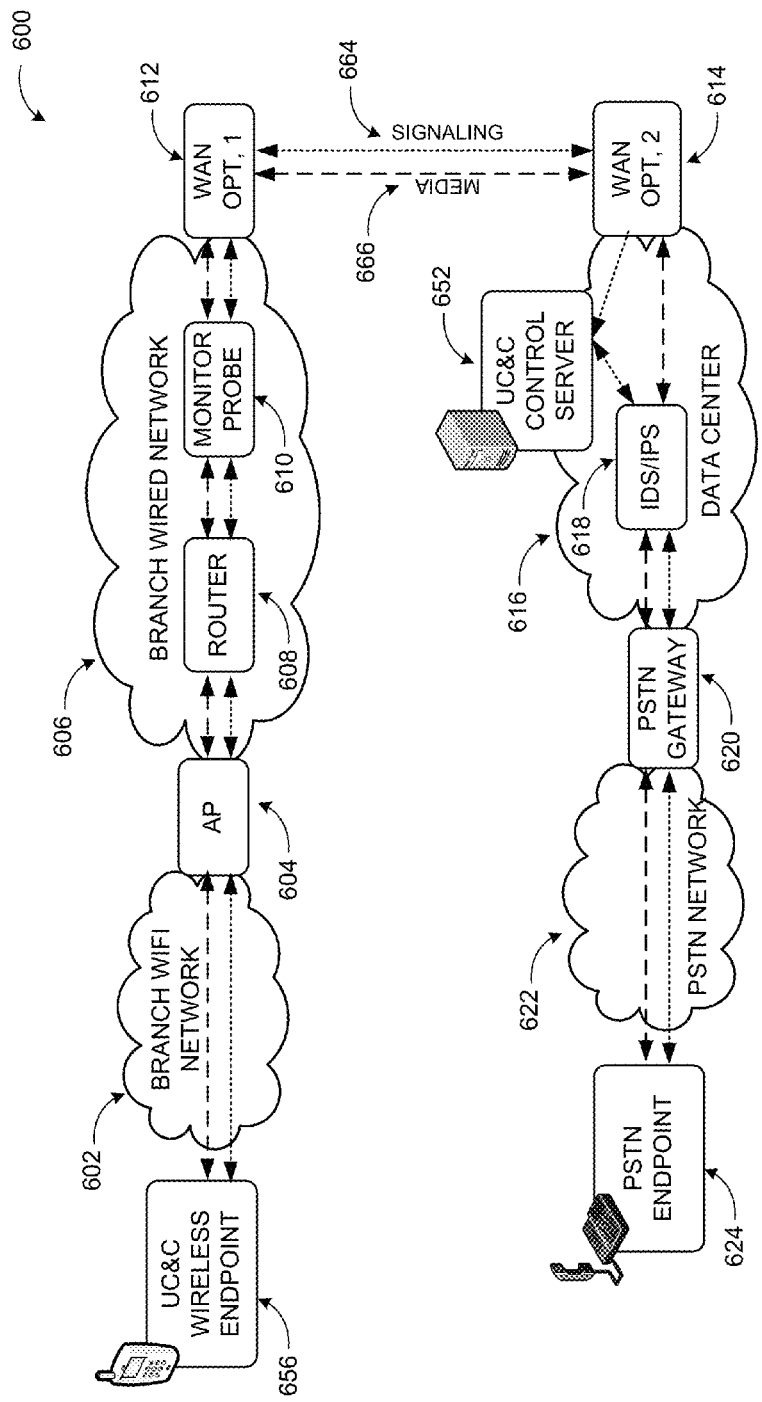
FIG. 6 illustrates an example implementation where a smart phone on a UC&C network places an audio call to a telephone in a public telephone system.

FIG. 6 illustrates an example implementation where a smart phone on a UC&C network places an audio call to a telephone in a public telephone system. Some or all of the network elements (NEs) illustrated in diagram 600 may be replaced with programmable NEs receiving flow policy instructions from a UC&C control point according to some embodiments.

In the example scenario of diagram 600, a UC&C wireless endpoint 656 (e.g., a smartphone) places an audio call to a user's PSTN endpoint 624 (phone) on the public telephone system. To accomplish this, the UC&C wireless endpoint 656 signals to the UC&C control server 652 the need to find and route a phone call to PSTN endpoint 624. The UC&C control server 652 performs this request by routing it via PSTN gateway 620 and in doing so also allows the media 666 to bypass the server and route all further media directly between the two endpoints. Following considerations may be taken into account in the establishment and facilitation of the audio communication session between the endpoints.

Quality of Service (QoS) may bring up the question of how do NEs access point (AP) 604, router 608, and WAN optimizers 1 & 2 (612 and 614) know which queue to place the media traffic. This may be accomplished if the endpoints mark the traffic with the correct QoS layer tag by the UC&C application. Conventional systems, where audio, video, and data communications are separately handled, the voice call may be placed on separate virtual networks and authenticated. However, in a system with integration of UC&C to smartphones and soft clients, running voice virtual networks throughout a facility may be very complex, expensive, and inefficient. Thus, a system according to embodiment may dynamically provision a network flow policy for certain NEs that have slow mediums, which are prone to congestion (e.g., Wi-Fi APs, branch WAN optimizers, etc.). Others NEs that have fast links like Gigabit Ethernet (GE) or faster are unlikely to get flash congested if the NEs are capable of full line rate. Employing the flow policy provisioning, QoS may be rolled out for UC&C in a network infrastructure more efficiently and effectively.

Many enterprises employ a network layer and Application Performance Monitoring (APM) systems to ensure that their networks and applications are performing correctly. Typical monitoring NEs such as monitoring probe 610 may not have sophisticated heuristic mechanisms due to price pressure on their fast path. Such NEs may also be incapable of monitoring call quality etc. of the encryption and dynamic ports of UC&C. Monitoring systems also tend to deploy probes in every segment of a network or use mirroring ports on switches or routers (e.g., router 608). In either case a network flow policy may be used to inexpensively and more efficiently count UC&C traffic compared to using expensive, specialized deep packet inspection NEs.

Modern networks typically use firewalls and IDS/IPS devices 618 to validate and protect various boundaries of an enterprise. However, as more and more traffic is being encrypted the effectiveness of these systems may depend on the intelligence of their heuristic systems, which may have a high degree of being false positive or negative. Also, regardless of the heuristic mechanism employed, it may be virtually impossible for any IDS/IPS network element to provide absolute accurate security unless it can inspect the payload of an encrypted packet via a decryption key. With the use of a network flow policy, IDS/IPS device 618 may be guaranteed that a packet matching a flow policy is authenticated, thereby allowing it to pass with 100% confidence reducing false alarms to the Network Operation Center (NOC) operators and securing a UC&C environment.

Thus, as the voice call placed by the UC&C wireless endpoint 656 to PSTN endpoint 624 flows through branch WIFI network 602, branch wired network 606, data center 616, and PSTN network 622 with the assistance and facilitation of various NEs as described above, specialized tasks of many of the NEs may be replaced by a flow policy based approach that takes advantage of separate media and signaling planes (666 and 664). The flow policy distributed to the NEs by the network infrastructure policy system based on received UC&C dialog information element(s) from UC&C control server(s) may enable those NEs to perform tasks associated with facilitating communication flows (e.g., monitor network health) through the network efficiently and in a less resource-intensive manner.

The example systems in FIG. 1 through 6 have been described with specific devices, applications, and interactions. Embodiments are not limited to systems according to these example configurations. A UC-aware communication system may be implemented in configurations employing fewer or additional components and performing other tasks. Furthermore, specific protocols and/or interfaces may be implemented in a similar manner using the principles described herein.

Figure 7:
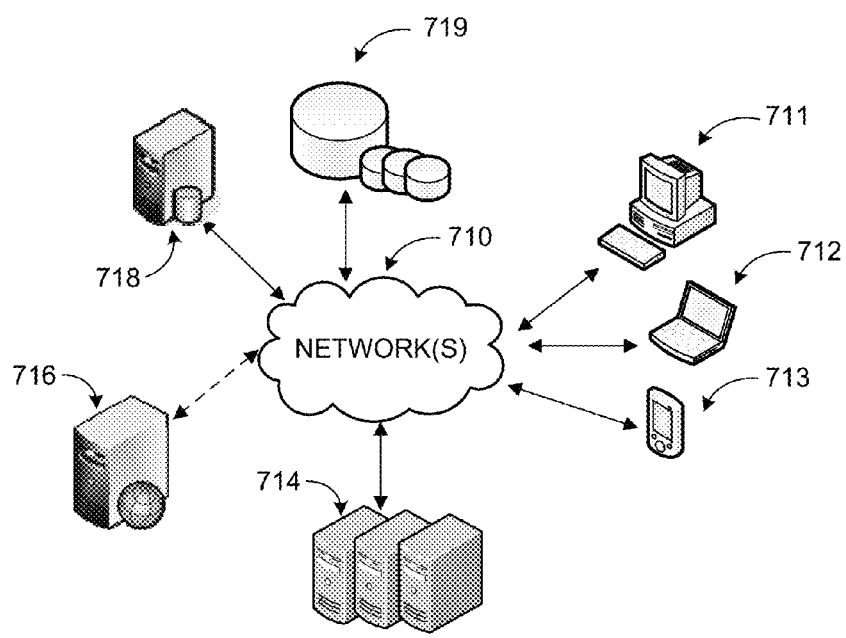
FIG. 7 is a networked environment, where a system according to embodiments may be implemented.

FIG. 7 is an example networked environment, where embodiments may be implemented. A UC-aware system may be implemented via software executed over one or more servers 714 such as a hosted service. The platform may communicate with client applications on individual computing devices such as a smart phone 713, a laptop computer 712, or desktop computer 711 ('client devices') through network(s) 710.

Client applications executed on any of the client devices 711-713 may facilitate communications via application(s) executed by servers 714, or on individual server 716. An application executed on one of the servers may facilitate multi-modal communication sessions with collaboration features. UC&C control points may dynamically enlighten a set of NEs and/or network infrastructure with application awareness so that an accurate set of rules or actions can be applied for a given session without needing to lookup the payload of every packet. The application may store the request for a communication session in data store(s) 719 directly or through database server 718.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to provide a UC-aware network. Furthermore, the networked environments discussed in FIG. 7 are for illustration purposes only. Embodiments are not limited to the example applications, modules, or processes.

Figure 8:
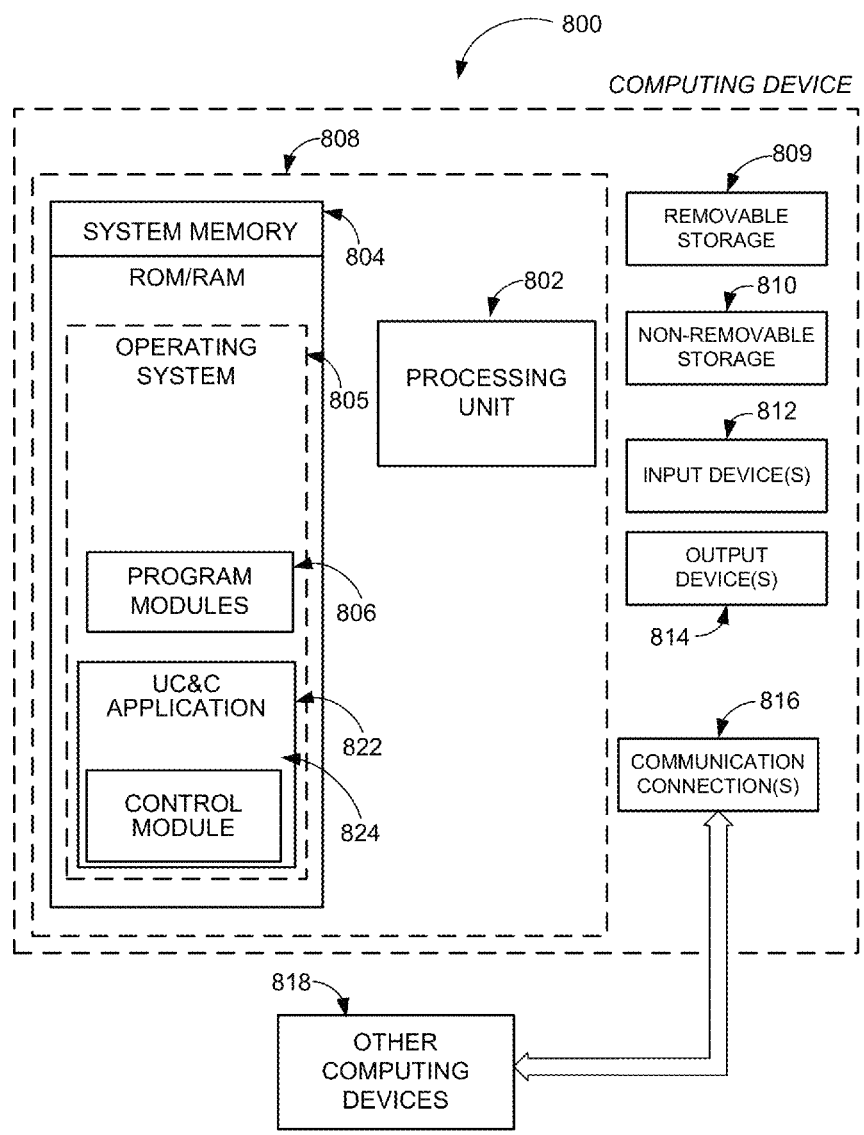
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be any computing device executing a UC&C application according to embodiments and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, UC&C application 822, and control module 824.

UC&C application 822 may facilitate multimodal communications and collaboration among subscribers of a UC&C network. In some embodiments, UC&C application 822 in coordination with the control module 824 may dynamically enlighten a set of inexpensive NEs and/or network infrastructure with application awareness so that an accurate set of rules or actions can be applied for a given session without needing to lookup the payload of every packet or applying a somewhat ineffective expensive heuristic mechanisms. UC&C application 822 and control module 824 may be separate applications or integrated modules of a hosted service. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wired or wireless network in a distributed computing environment, a satellite link, a cellular link, a short range network, and comparable mechanisms. Other devices 818 may include computer device(s) that execute communication applications, web servers, and comparable devices. Communication connection(s) 816 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
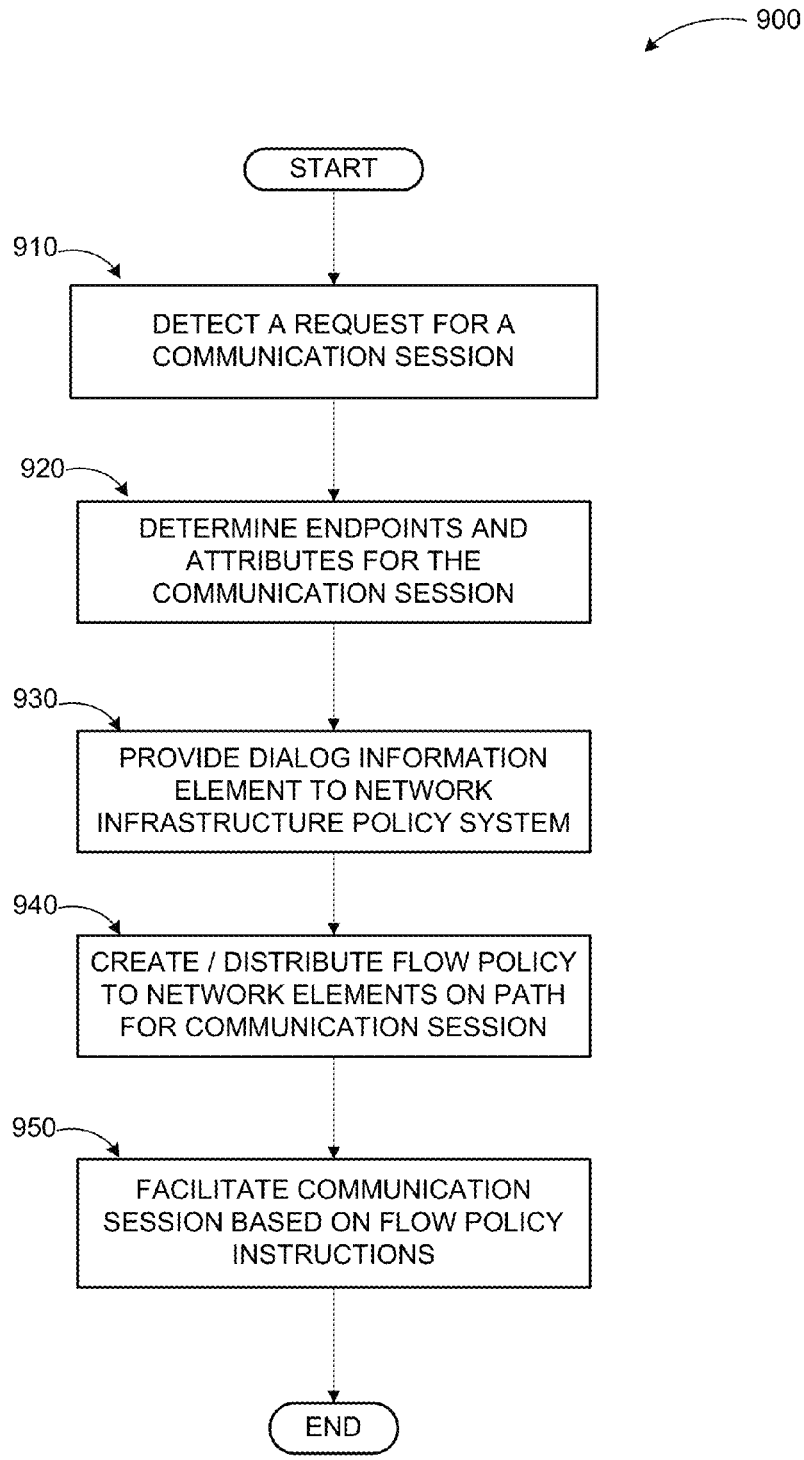
FIG. 9 illustrates a logic flow diagram for a process of providing UC aware wireless network communications according to embodiments.

FIG. 9 illustrates a logic flow diagram for a process of providing UC aware wireless network communications according to embodiments. Process 900 may be implemented on a computing device that may manage communication sessions. The communication sessions may include an audio call, an application sharing session, a data sharing session, a whiteboard sharing session, and/or a video conference.

Process 900 begins with operation 910, where a UC&C control server may detect a communication session request from one of the UC&C endpoints. The request may be for any type of modality or a collaboration session. At operation 920, the UC&C control server may determine the applicable endpoints for the requested communication session and the attributes for the session such as source and destination network addresses, transport type, source and destination ports for the transport, encryption status, media type, and/or codex information.

At operation 930, the UC&C control server may provide the attributes to the network infrastructure policy system as a 5 tuple in a UC&C dialog information element. The network infrastructure policy system may create and distribute a flow policy based on the UC&C dialog information element to the affected network elements at operation 940. Programmable network elements receiving the flow policy from the network infrastructure policy system may facilitate the communication session based on the instructions in the flow policy at operation 950. The protocols, architecture, and hierarchy for the distribution of the flow policy may be based on a scale and desired and/or available performance of the network.

The operations included in process 900 are for illustration purposes. A UC-aware communication system may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method at least partially executed on a computing device for facilitating communication sessions in a uniform communication and collaboration (UC&C) aware network, the method comprising:
   detecting a request for a communication session;
   determining one or more attributes and two or more endpoints associated with the requested communication session;
   providing a UC&C dialog information element based on the determined endpoints and attributes to a network infrastructure policy system to inform the network infrastructure policy system of an imminent creation of a UC&C dialog represented by the UC&C dialog information element;
   creating a flow policy for the communication session based on the UC&C dialog information element;
   distributing the flow policy to network elements (NEs) on a path of a media flow in a scalable and timely manner based on a duration of the UC&C dialog for facilitating the communication session, wherein the NEs are enabled to index a packet to the media flow based on the UC&C dialog information element associated with the distributed flow policy such that a performance of a deep packet inspection on the packet is omitted; and
   in response to a determination that the flow policy is not distributed to the NEs in the timely manner, using another media flow from a previous communication session for facilitating the communication session, wherein Quality of Service (QoS), security, and monitoring are not applied to the other media flow.

2. The method of claim 1, further comprising:
   employing a control plane for management and signaling exchanges and a separate media plane for media exchange between a UC&C control server providing the UC&C dialog information element, the network infrastructure policy system, and the endpoints.

3. The method of claim 2, wherein the signaling exchange in the control plane is employed to discover, to set up, and to secure the two or more endpoints before the media is exchanged.

4. The method of claim 1, further comprising:
   including network addresses for source and destination endpoints, a transport mechanism, transport source and destination ports, a media type, a codex associated with the media, and encryption information in the UC&C dialog information element.

5. The method of claim 4, further comprising:
   including a flow record, a flow 5 tuple, and at least one action for an addressed NE in the flow policy in response to the UC&C dialog information element.

6. The method of claim 5, wherein the flow 5 tuple includes the network addresses for source and destination endpoints, the transport mechanism, and the transport source and destination ports.

7. The method of claim 5, wherein the NEs index the packet to the flow record associated with the communication session as defined by the flow policy.

8. The method of claim 1, further comprising:
   enabling the NEs along the path of the media flow to identify and perform a correct action on, to validate an accuracy and an authenticity of the media through the flow policy.

9. The method of claim 1, further comprising:
   for an audio communication session, dynamically provisioning the flow policy to NEs that are prone to data congestion due to slow response.

10. The method of claim 1, further comprising:
    enabling monitoring of network health through counting by the NEs along the path of the media flow.

11. The method of claim 1, further comprising:
    authenticating a packet to an Intrusion Detection/Protection (IDS/IDP) element along the path of the media flow through the flow policy in order to enable the IDS/IDP element to pass the packet with confidence.

12. The method of claim 1, wherein the communication session is at least one from a set of: an audio call, an application sharing session, a data sharing session, a whiteboard sharing session, a video conference, and a collaboration exchange.

13. A computing device acting as a uniform communication and collaboration (UC&C) control server for facilitating communication sessions in a UC&C aware network, the computing device comprising:
    a memory;
    a processor coupled to the memory, the processor executing a UC&C control application in conjunction with instructions stored in the memory, wherein the UC&C control application is configured to:
       detect a request for a communication session;
       determine two or more endpoints and one or more attributes associated with the requested communication session, the attributes including at least one from a set of: network addresses for source and destination endpoints, a transport mechanism, transport source and destination ports, a media type, a codex associated with the media, and encryption information;
       provide a UC&C dialog information element based on the determined endpoints and attributes to a network infrastructure policy system to inform the network infrastructure policy system of an imminent creation of a UC&C dialog represented by the UC&C dialog information element;
       enable the network infrastructure policy system to create a flow policy for the communication session based on the UC&C dialog information element; and
       enable the network infrastructure policy system to distribute the flow policy to network elements (NEs) on a path of a media flow in a scalable and timely manner based on a duration of the UC&C dialog for facilitating the communication session, wherein the NEs are enabled to index a packet to the media flow based on the UC&C dialog information element associated with the distributed flow policy such that a performance of a deep packet inspection on the packet is omitted; and in response to a determination that the flow policy is not distributed to the NEs, use another media flow from a previous communication session for facilitating the communication session, wherein Quality of Service (QoS), security, and monitoring are not applied to the other media flow.

14. The computing device of claim 13, wherein the UC&C control application is configured to:

enable the NEs to index the packet to a flow record included in the flow policy response to the UC&C dialog information element, wherein an employed protocol, an architecture, and a hierarchy for implementing flow policy distribution based on the UC&C dialog information element is based on one of a scale, a desired performance, and a capability of the network.

15. The computing device of claim 13, wherein the UC&C control application is configured to:

upon establishing the initial connection between the endpoints, enable the media to bypass the UC&C control server and be routed directly between the endpoints.

16. The computing device of claim 13, wherein the NEs include one or more of an access point, a router, a switch, a wide area network (WAN) optimizer, a gateway, a firewall, a monitoring probe, and an Intrusion Detection/Protection (IDS/IDP) element.

17. The computing device of claim 16, wherein in response to an action listed in the flow policy for each respective NE:

all NEs are enabled to count;

the switch and the router are further enabled to prioritize, shape, and one of allow and deny;

the IDS/IPS element is fluffier enabled to one of allow and deny;

the firewall is further enabled to one of allow and deny; and the WAN optimizer is further configured to prioritize and shape.

18. A computer-readable memory device with instructions stored thereon for facilitating communication sessions in a uniform communication and collaboration (UC&C) aware network, the instructions comprising:

detecting a request for a communication session;

determining two or more endpoints and one or more attributes associated with the requested communication session, the attributes including at least one from a set of: network addresses for source and destination endpoints, a transport mechanism, transport source and destination ports, a media type, a codex associated with the media, and encryption information;

providing a UC&C dialog information element based on the determined endpoints and attributes to a network infrastructure policy system to inform the network infrastructure policy system of an imminent creation of a UC&C dialog represented by the UC&C dialog information element;

enabling the network infrastructure policy system to create a flow policy for the communication session based on the UC&C dialog information element, the flow policy including a flow record, a flow 5 tuple, and at least one action for an addressed network element (NE), wherein the flow 5 tuple includes the network addresses for source and destination endpoints, the transport mechanism, and the transport source and destination ports;

enabling the network infrastructure policy system to distribute the flow policy to NEs on a path of a media flow in a scalable and timely manner based on a duration of the UC&C dialog for facilitating the communication session;

enabling the NEs to index a packet to the media flow based on the UC&C dialog information element associated with the distributed flow policy such that a performance of a deep packet inspection on the packet is omitted; and in response to a determination that the flow policy is not distributed to the NEs in the timely manner, using another media flow from a previous communication session for facilitating the communication session, wherein Quality of Service (QoS), security, and monitoring are not applied to the other media flow.

19. The computer-readable memory device of claim 18, wherein the distributed policy flow provides each of the NEs on the path of the media flow with one or more actions to be performed on the packet.

20. The computer-readable memory device of claim 19, wherein one of Real time Transport Protocol (RTP) and Secure RTP (SRTP) is used for audio and video media exchange, and Session Initiation Protocol (SIP) is used for signaling.

* * * * *